Oct. 19, 1965 P. R. O'BRIEN 3,212,941
METHOD OF PRODUCING A BUMPER
Filed Oct. 26, 1960 8 Sheets-Sheet 1

INVENTOR
PAUL R. O'BRIEN

BY *Glenn & Jackson*

HIS ATTORNEYS

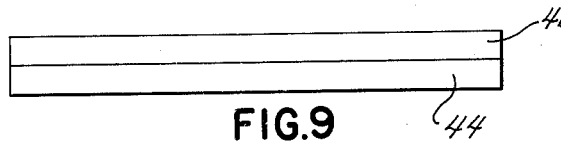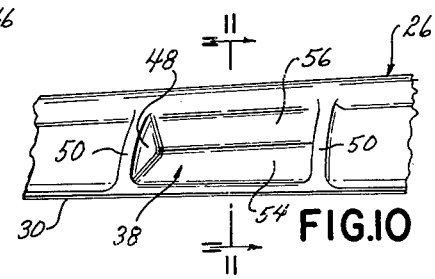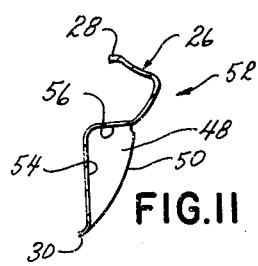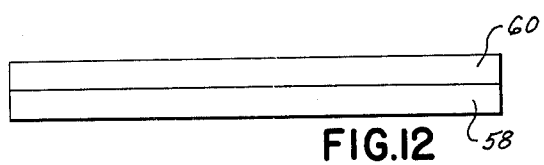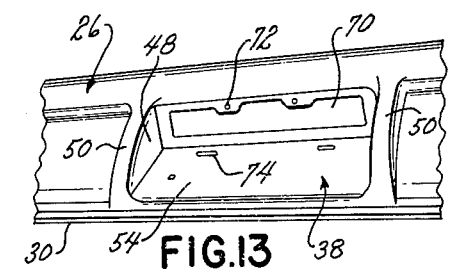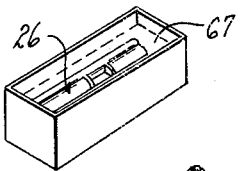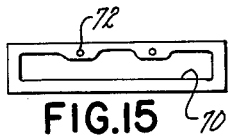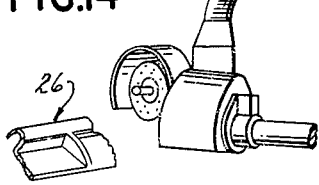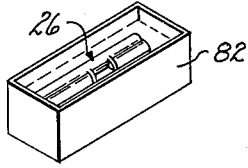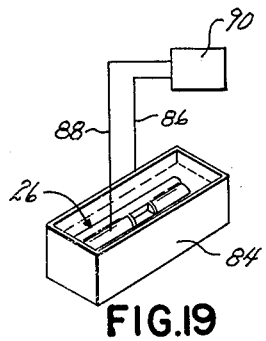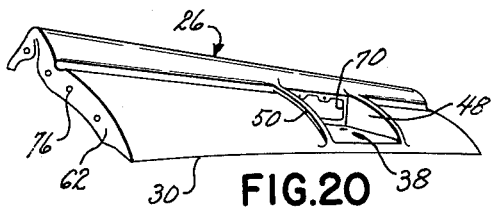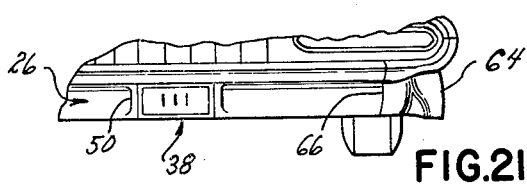

Oct. 19, 1965   P. R. O'BRIEN   3,212,941
METHOD OF PRODUCING A BUMPER
Filed Oct. 26, 1960   8 Sheets-Sheet 5
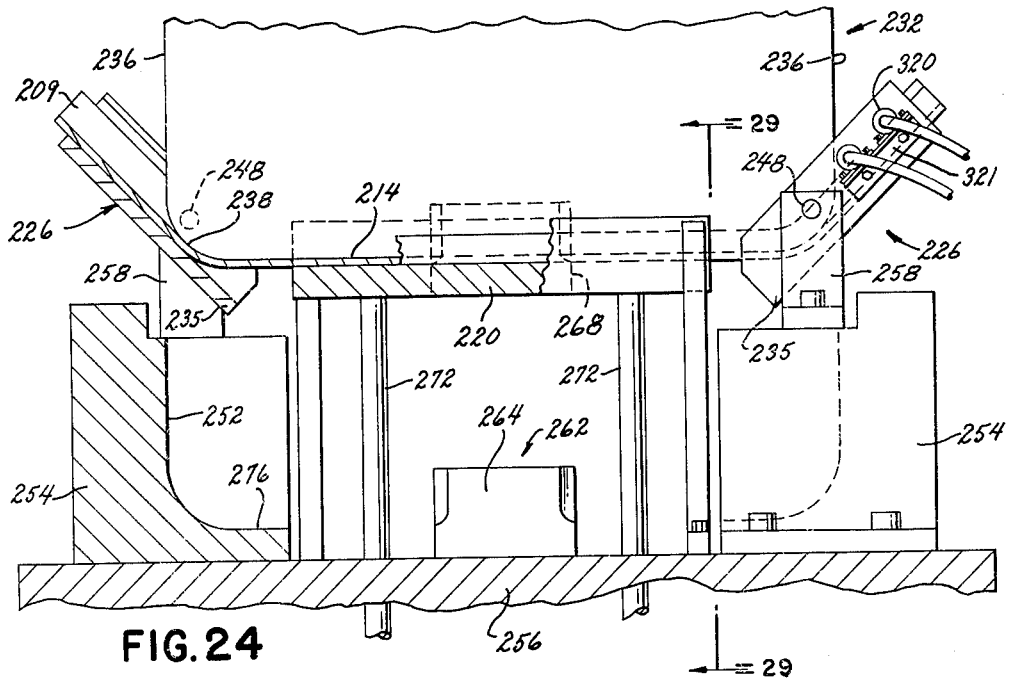
FIG. 24
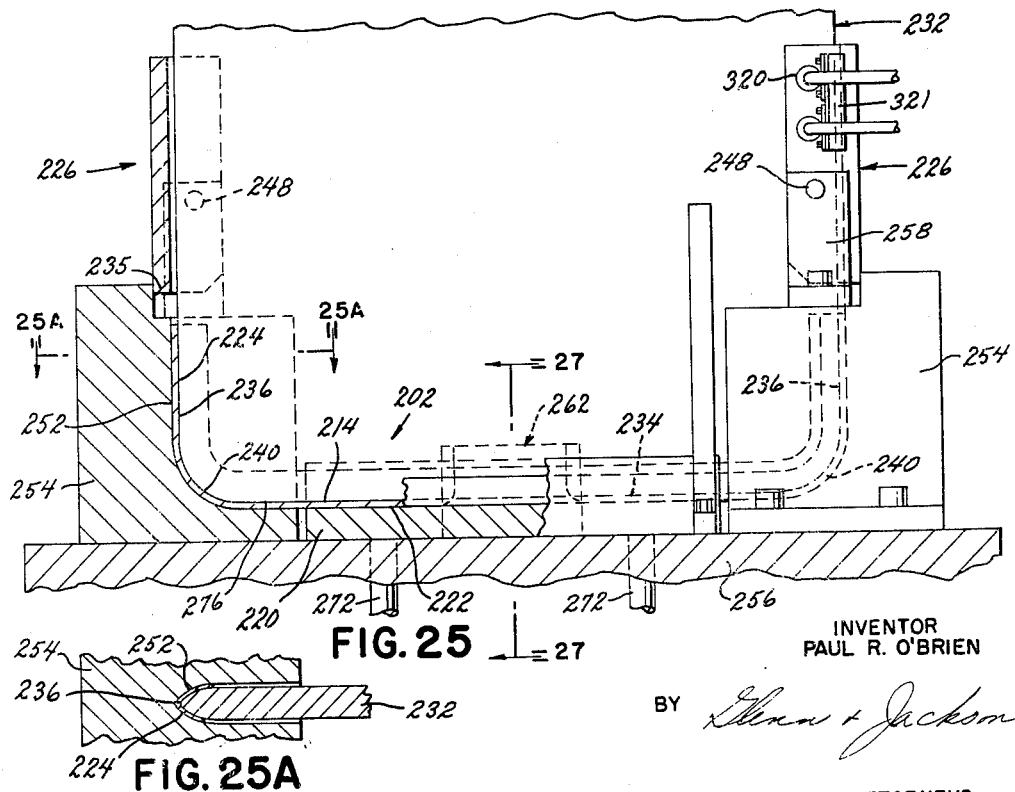
FIG. 25
FIG. 25A
INVENTOR
PAUL R. O'BRIEN
BY Glenn + Jackson
HIS ATTORNEYS Oct. 19, 1965   P. R. O'BRIEN   3,212,941
METHOD OF PRODUCING A BUMPER
Filed Oct. 26, 1960   8 Sheets-Sheet 6
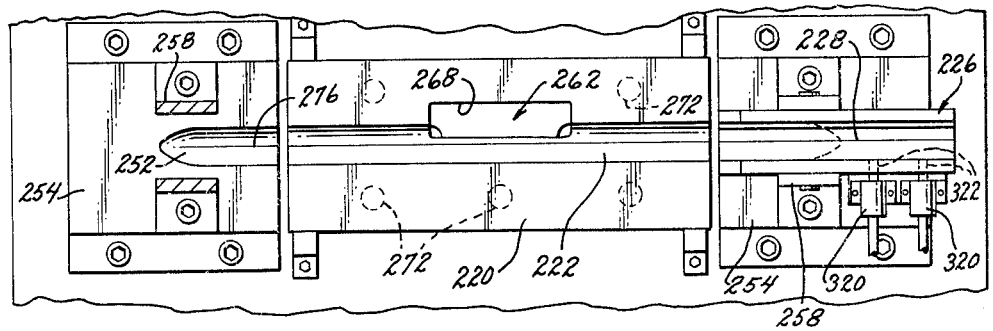
FIG. 26
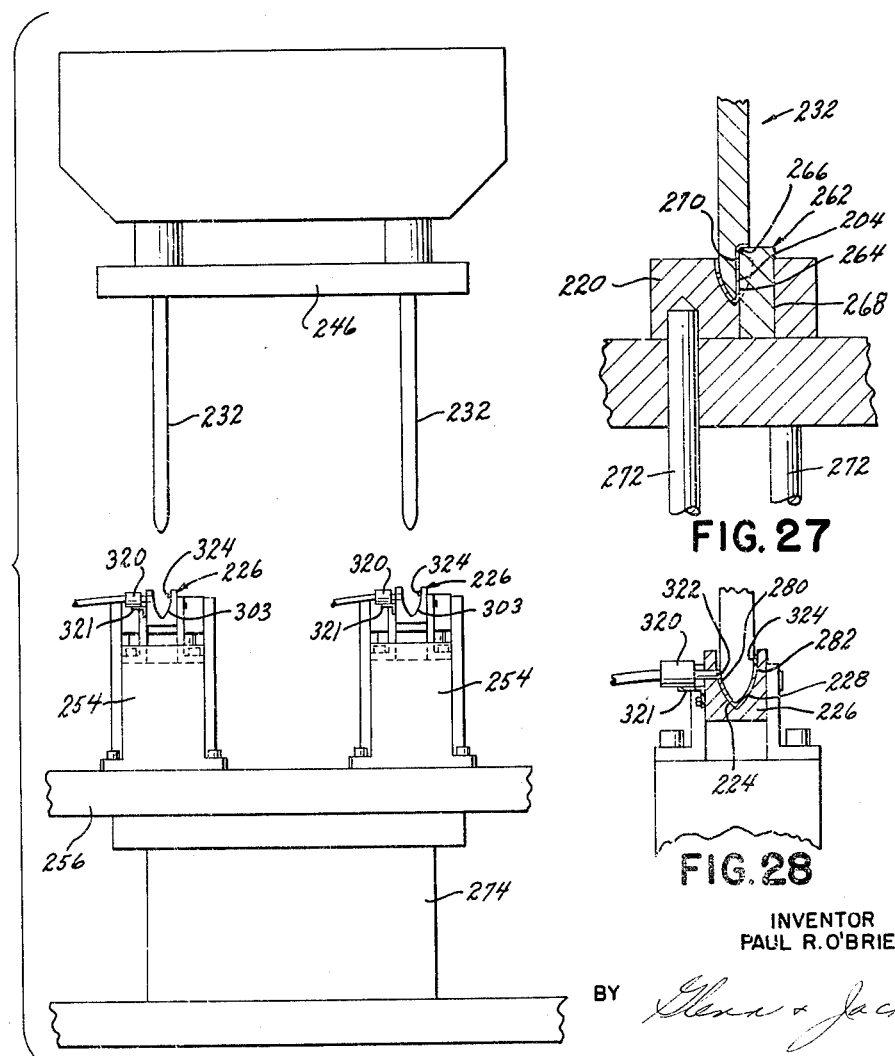
FIG. 27
FIG. 28
FIG. 30
INVENTOR
PAUL R. O'BRIEN
BY *Glenn + Jackson*
HIS ATTORNEYS Oct. 19, 1965          P. R. O'BRIEN          3,212,941

METHOD OF PRODUCING A BUMPER

Filed Oct. 26, 1960          8 Sheets-Sheet 7

INVENTOR
PAUL R. O'BRIEN

BY *Steven & Jackson*

HIS ATTORNEYS

Oct. 19, 1965   P. R. O'BRIEN   3,212,941
METHOD OF PRODUCING A BUMPER
Filed Oct. 26, 1960   8 Sheets-Sheet 8

INVENTOR.
PAUL R. O'BRIEN
BY Glenn L. Jackson
HIS ATTORNEYS

United States Patent Office
3,212,941
Patented Oct. 19, 1965

3,212,941
METHOD OF PRODUCING A BUMPER
Paul R. O'Brien, Anchorage, Ky., assignor to Reynolds Metals Company, Richmond, Va., a corporation of Delaware
Filed Oct. 26, 1960, Ser. No. 65,138
12 Claims. (Cl. 148—12.7)

This application is a continuation-in-part of my application, Serial No. 25,689, filed April 29, 1960, now abandoned, for An Aluminum Article, Such as Bumper, and the Like.

This invention relates to the production of brilliant surface aluminum containing bumpers for automotive vehicles, such as automobiles and the like, which bumpers are formed from aluminum containing metallic substances.

Automotive vehicle bumpers have been made by forming sheet steel of relatively uniform thickness into the desired shape in various presses and the like. Thereafter the bumpers so formed have been chrome plated to the desired chrome thickness and brightness. These bumpers have undesirable disadvantages. For example, such bumpers do not have the necessary strength along the area where extra strength is needed. Also such steel bumpers are relatively heavy and have an undesirable weight effect at the ends of the car, and particularly when subjected to the salt splash from salted highways.

According to this invention, automobile bumpers are made from aluminum containing metallic material in a manner so that such aluminum bumpers have from two to six times the impact and load capacities of steel bumpers. The cost ratio is favorable to the aluminum bumpers, and with proper product design may be as much as about a five to seven ratio. In addition the thickness of the material may be increased where most needed, such as at the upper and lower edges where tow chains may create a bending action, and also at the impact bead at the outermost zone of the bumper. Also the aluminum containing bumper will not corrode and will not lose its brightness in the manner of a steel bumper.

The bumper of this invention is made of an aluminum containing metallic substance such as an aluminum heat treatable alloy, preferably a magnesium alloy, which may be, for example, a wrought aluminum alloy of the series containing aluminum alloy 6463–T6 or a similar alloy.

The bumper of this invention overcomes many of the objectionable features of sheet steel bumpers which are now in use.

The thickness of the material is increased at the impact ridge where impacts are most likely and at the edges of the bumper. This produces a beam-like action which strongly resists bending during impact, towing, pushing, etc.

The bumper of this invention has approximately ½ the weight of a sheet steel bumper of comparable size and strength. The cost ratio also is very favorable. The tooling cost is approximately ½ that of tools for comparable steel bumpers. It does not corrode materially and does not lose its brightness.

The novel manufacture of this invention includes novel methods for efficient production of the bumper.

The operation includes a combined formation and heat treatment that gives greater physical strength, improved properties and increased specularity or reflectivity.

Accordingly, it is an object of this invention to provide a method of producing an improved bumper made of metallic substances which contain a large proportion of aluminum.

Another object of this invention is to provide aluminum containing bumpers in which the thickness of the material is increased where most needed.

Further objects are apparent from this description and from the accompanying drawings, in which:

FIGURE 9 is a diagrammatic representation of a die construction for a second forming operation.

FIGURE 10 is a diagrammatic representation of a portion of the blank after the second forming operation.

FIGURE 11 is a cross section along the line 11—11 of FIGURE 10.

FIGURE 12 is a diagrammatic representation of a die construction for a third forming operation.

FIGURE 13 is a diagrammatic representation of a portion of the blank after the third forming operation, and piercing operation.

FIGURE 14 is a diagrammaatic representation of the quenching operation following the forming procedure.

FIGURE 15 is a diagrammatic representation of the trimming and piercing operations following the quenching operation.

FIGURE 16 is a diagrammatic representation of the precipitation heat treatment for artificial aging.

FIGURE 17 is a diagrammatic representation of the polishing and buffing operations following the aging operation.

FIGURE 18 is a diagrammatic representation of the bright dip operation following the polishing and buffing operation.

FIGURE 19 is a diagrammatic representation of the anodizing operation following the bright dip operation.

FIGURE 20 is a diagrammatic representation of the finished bumper part in readiness to be installed on the automobile.

FIGURE 21 is a diagrammatic representation of a portion of the article of FIGURES 1–20 in use on the automobile.

FIGURE 24 is a view of a portion of FIGURE 23 showing the parts during an early stage of the forming or bending stroke.

FIGURE 25 is a view of the part of FIGURE 24 at the end of the stroke.

FIGURE 25A is a cross section along the line 25A—25A of FIGURE 25.

FIGURE 26 is a horizontal cross section along the line 26—26 of FIGURE 23, with the blank removed.

FIGURE 27 is a cross section along line 27—27 of FIGURE 25.

FIGURE 28 is a cross section along the line 28—28 of FIGURE 23.

FIGURE 30 is a diagrammatic elevation of the front of a press having a pair of duplicate bending apparatus of the character shown in FIGURES 23–29 inclusive.

Certain words indicating direction and the like, such as "bottom," "top," "above," "below," etc., are used for convenience in description, and are not intended to imply that the invention is limited to the specific directions so described.

According to this invention, a proper aluminum containing metallic substance, preferably in the alloy form, such as an alloy known as Number 6463, is formed into a brilliant surface aluminum containing metallic bumper by the operations which are outlined in FIGURE 22 as illustrative of the practice of the invention as follows:

(1) The alloy is cast at A into logs B such as from 6 inches to 14 inches in diameter D.C.

(2) The logs are homogenized at C such as in a 33 hour cycle of which 24 hours may be a temperature "soak" in an air atmosphere at a temperature in the order of 1100° to 1150° F. This step is important in removing irregular streaked colored surfaces known in the trade as "structural steaking." This is an important step in the process for obtaining maximum specularity. The homogenizing time cycle, including the "soaking" temperature, may vary from 18 to 48 hours depending upon the particular material being treated.

(3) The logs are cut at E to proper length to form billets F for use in proper extruding apparatus.

(4) The billets are heated to extruding temperature at G.

(5) The billets F are extruded at H in proper apparatus to form a strip I of the desired shape, which shape may be, for example, any of the open channel shapes of the blanks for bumper formation herein disclosed.

(6) The strip I is then cut at J into blanks K of substantially the length of the article being produced, with sufficient additional material to provide for procedure losses.

(7) The blanks K are heated to a temperature in the order of 935° to 980° F. in furnace L. They are soaked in furnace L for a maximum period of time (such as five to fifteen minutes) in an atmosphere of air and ammonium fluoborate ($NH_4BF_4$) and the like. For example, one ounce of ammonium fluoborate to 48 cubic feet of furnace capacity may be introduced into the furnace L in sufficiently comminuted form to be taken up by the air which is forcibly circulated in the furnace L by a suitable fan or blower.

The ammonium fluoborate reacts with the aluminum in the blank K to form a preferred type of oxide which is believed to be a complex aluminum fluoborate coating.

The aluminum ammonium fluoborate coating prevents attack of the surface by a gas such as hydrogen which would otherwise result in a non-uniform attack of the surface and, therefore, result in a blotchy appearance. However, with this complex coating, a uniform and brightening attack of the surface is later made by the chemical-brightening composition. This is particularly true of aluminum containing magnesium alloys.

This atmosphere is illustrative of any desired brilliant surface forming medium or hydrogen absorption resistance producing medium.

Figure 22:
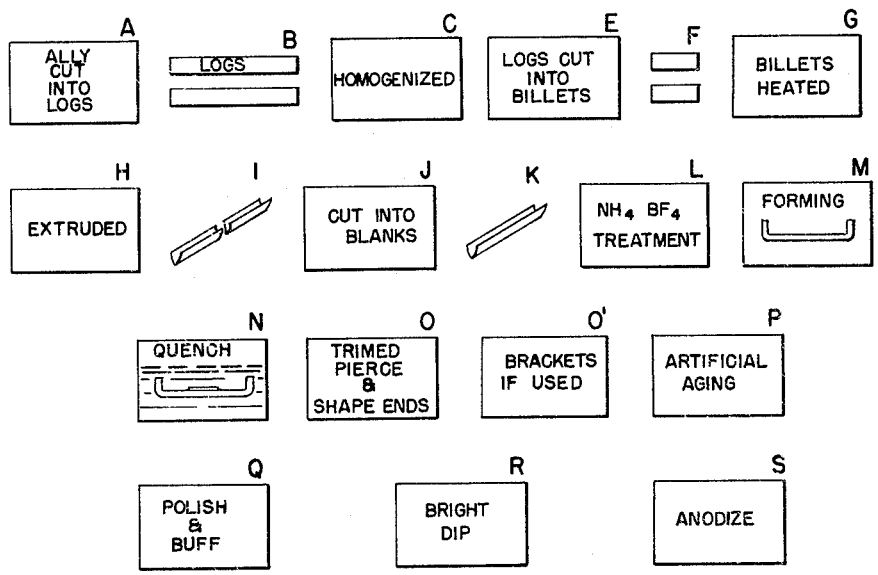
FIGURE 22 is a chart indicating steps which may be performed for the production of the bumper.

(8) Within 10 to 45 seconds time interval after the operation 7 above, the blank K is subjected to forming procedure which may include one or more forming procedures diagrammatically illustrated at M in FIGURE 22.

The illustration at M is emblematic of any of the various forming procedures herein disclosed, or similar forming procedures according to this invention.

(9) After the desired number of forming operations, the bumper is quickly quenched substantially to room temperature, such as in a violent air agitation or in a water quench, as diagrammatically indicated at N, FIGURE 22.

(10) The bumper is then trimmed and pierced at O, FIGURE 22, to the desired final shape in proper apparatus. For example, the area which receives the license plates in a bumper construction may be simultaneously pierced at a plurality of points such as shown in FIGURE 13 by the die member shown in FIGURE 15 which figures are merely illustrative of the trimming and piercing operations which are or may be performed on the article and in any of the embodiments herein disclosed. The brackets are attached at O'.

(11) The bumper may then be artificially aged at P, in FIGURE 22, such as by a precipitation heat treatment, as in a furnace at a temperature of 360° F. for four to six hours or at 375° F. for from one and one-half to three hours to produce the desired temper, such as a T6 temper. This treatment is also diagrammatically indicated in FIGURE 16.

(12) If desired, smoothing operations, such as suitable polishing and/or buffing operations, may be performed at Q, FIGURE 22, on the exterior surface of the article where desired, as also is diagrammatically indicated in FIGURE 17.

(13) If desired, the bumper may be chemically brightened at R, FIGURE 22, and as also diagrammatically indicated in FIGURE 18 in any well known chemical brightening solution. For example, one suitable commercially available chemical brightening solution contains about 81% phosphoric acid, 3% nitric acid, and the remainder water. The solution may be maintained at an operating temperature of about 185° F.

Thereafter, the article may be anodized at 8 in FIGURE 22 and as also diagrammatically indicated in FIGURE 19, in any well known anodizing solution, to produce an aluminum oxide film of from .00015 to .0003 inch in thickness.

Figure 1:
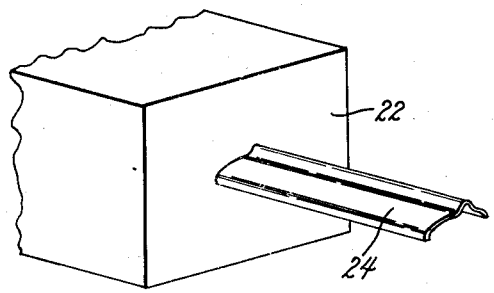
FIGURE 1 is a diagrammatic representation of a typical extrusion operation for this invention.

Describing in more detail the operations of FIGURES 1 to 19, which relate to one embodiment of this invention, the specific article illustrated for the purpose of illustration is a part of the rear bumper of a 1959 Pontiac automobile, modified according to this invention. The extruding apparatus 22, FIGURE 1, or H in FIGURE 22, extrudes a relatively long strip 24 of FIGURE 2 or I of FIGURE 22, by well known process, which may include the operations 1 to 5 above and steps A–I FIGURE 22. The blank 26, FIGURE 2 or I of FIGURE 22, may be cut to length at J. FIGURE 22, as above described for operation 6, or the blank may be produced after a light stretching operation.

Figure 3:
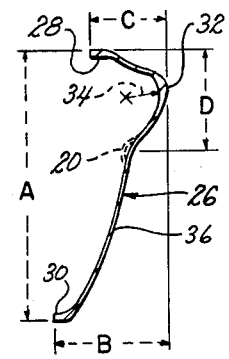
FIGURE 3 is an enlarged cross section along the line 3—3 of FIGURE 2.

The cross section of the strip 24, and/or blank 26 is indicated in FIGURE 3. The thickness of the material may be increased where most needed, such as at the edges 28 and 30 and at the outward impact curve 32. For example, the thickness at edge 28 may be .240 inch in vertical measurement. The thickness of edge 30 may be .260 inch in vertical measurement. The thickness of curve 32, at its thickest point, may be .281 inch in thickness, measured along the radial line 34, where such radial line 34 intersects at the thickest portion of the curved part 32. The typical thickness of the main portion of the wall may be .110 inch, for example, at a place such as 36 in FIGURE 3. By way of example, the dimension of A may be 10.532 inches. The dimension B may be 3.750 inches. The dimension C may be 3.188 inches. The dimension D may be 3.906 inches, and the other dimensions may be substantially in the general ratio indicated in FIGURE 3.

Figure 2:
FIGURE 2 is a diagrammatic representation of a typical blank cut from the extrusion of FIGURE 1.
Figure 4:
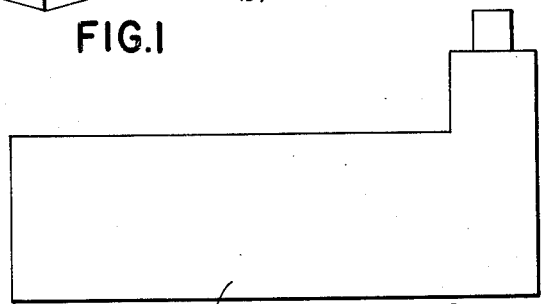
FIGURE 4 is a diagrammatic representation of an apparatus in which the brilliant surface enhancing medium may be applied.

The blank shown in FIGURES 2 and 3 may "soak" in the furnace 37, FIGURE 4, or L, in FIGURE 22, for a period of from five (5) to fifteen (15) minutes in an atmosphere of air into which ammonium fluoborate has been added. This substance may be introduced in solid or comminuted form, if desired, into the furnace 37, or to where such substance vaporizes and mixes with the circulated air in the furnace 37 or L to form a brilliant surface enhancing medium, or a hydrogen absorption resistance producing medium, which is particularly beneficial in enhancing the effectiveness of the chemical brightening and anodizing operations which are later performed on the article, and in preventing hydrogen absorption during the entire manufacturing operation which follows.

Figure 5:
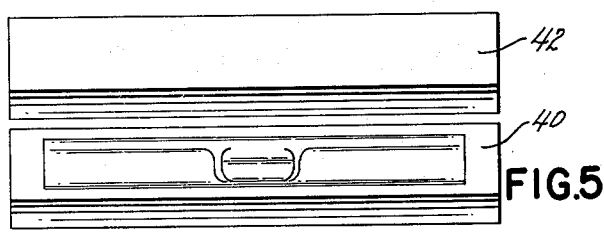
FIGURE 5 is a diagrammatic representation of die construction for the first forming operation.

A forming procedure is then performed on the blank within about 10 to 45 seconds after the soaking operation in the furnace 37. The forming procedure may include one or more forming operations. For example, a first forming draw is performed while the blank is still within about from 900° to 950° F., as diagrammatically indicated in FIGURES 5 to 7, and possibly FIGURE 8. FIGURE 5 is a diagrammatic representation of any drawing die construction which will produce the preliminary license plate receiving indentation 38, FIGURE 6, in the blank. The diagrammatic illustration in FIGURE 5 is merely to indicate that a pair of relatively movable die members 40 and 42 may be operated by a suitable press, in a well known manner, to produce the indentation 38. The dies 40 and 42 preferably are heated to a temperature of 350° to 400° F.

A second forming operation may be performed while the blank is still at a temperature of from 850° to 900° F., as diagrammatically illustrated in FIGURES 9, 10 and 11. The die members diagrammatically indicated at 44 and 46 are relatively movable towards and away from each other by a suitable press as heretofore described in connection with FIGURE 5. It performs a second draw on the indentation 38 of FIGURES 6 and 7 so that the walls 48 are substantially perpendicular to the general longitudinal axis of the bumper and are bounded by the ridges 50 which are rigidfying and ornamental in nature. The dies, 44 and 46, preferably are also heated to a temperature of 350°–400° F. This second draw may substantially finish the indentation 38 to its desired shape, so that it will be in readiness for the trimming and piercing operation which will be performed later. In addition, this second forming operation may alter the inner contour of the cross section throughout the length of the blank, for example, as indicated along the cross section 52, FIGURE 11, and may form bead 20, of FIGURE 3, on both sides of the license plate indentation 38. The license plate receiving wall 54 has now been formed substantially at right angles to the other wall 56.

Figure 8:
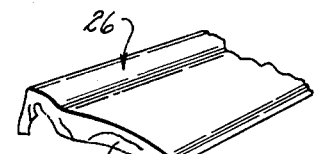
FIGURE 8 is a diagrammatic representation of the end of the blank after the first forming operation.
Figure 6:
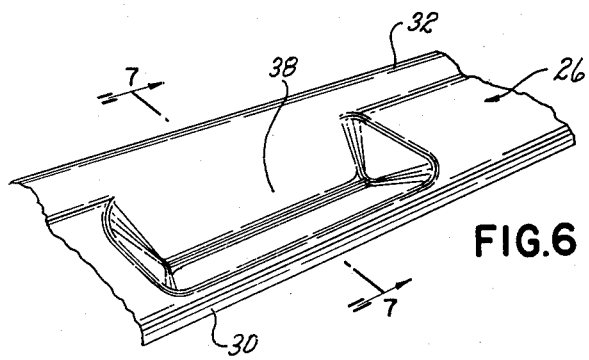
FIGURE 6 is a diagrammatic representation of a portion of the blank after the first forming operation.
Figure 7:
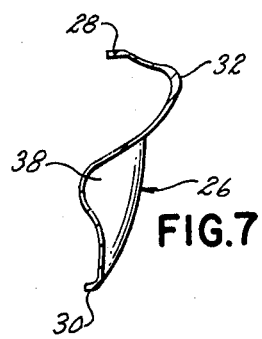
FIGURE 7 is a cross section along the line 7—7 of FIGURE 6.

If desired, a third forming operation may be performed by a pair of dies diagrammatically indicated at 58 and 60 in FIGURE 12 which bend the end portion of the blank at 62 in the direction of the spaced edges 28 and 30, as shown in FIGURE 8, if not previously formed, so that this part may be later trimmed and pierced. The end portion 62 later will cooperate with the additional portions 64 of the bumper construction on the car, as illustrated in FIGURE 21, to form a neat seam 66 and a strong junction at this point as will become apparent to those skilled in the art. This third forming operation may be performed while the blank is still at a temperature of from about 800° F. to 850° F. The dies 58 and 60 preferably are heated to a temperature of 350°–400° F.

Thereafter, the blank, while still in a heated condition, and as soon as possible after the last forming operation, may be quenched as diagrammatically indicated by FIGURE 14, and N of FIGURE 22, in a water bath 67, or in a violent air agitation apparatus or water spray, not shown.

After the quenching operation, the blank may be trimmed and pierced where required, as diagrammatically indicated in FIGURES 13 and 15 to produce piercings 70, 72, 74, 76 and any other desired trimming or piercing operations which may be necessary.

After the piercing and trimming operation, the blank may be artificially aged such as by a precipitation heat treatment to produce the desired temper, such as a T6 temper. This may be done in any well known manner, as, for example, in a furnace shown in FIGURE 16, or at P, FIGURE 22, wherein the air atmosphere is maintained at a temperature of from 360° F. to 375° F., as previously described. This artificial age treatment may be at the temperatures and for the periods of time heretofore given.

Thereafter the exterior surfaces of the blank or bumper may undergo a smoothing treatment such as a polishing and buffing treatment by any suitable apparatus, FIGURE 17 and Q of FIGURE 22, of which FIGURE 17 is merely a diagrammatic representation.

Thereafter the bumper my be chemically brightened, for example, in the tank 82, FIGURE 18 or R, FIGURE 22, in any desired commercial chemical brightening solution.

Thereafter the bumper may be anodized, for example, as indicated at 8, FIGURE 22, or in the tank construction 84 of FIGURE 19 to which the electrical leads 86 and 88 from the current source 90 may be connected respectively to the cathode which may be the tank wall, if desired, and to the anode, which may be the bumper, to produce an oxide film of the thickness heretofore disclosed.

The finished bumper is then in the form as shown in FIGURE 20 in readiness to be installed on an automobile to cooperate with the other part 64 of the bumper, as shown in FIGURE 21, to which it is attached by bolts passing through bolt holes 76, FIGURE 20 with the channel open portion formed by the spaced edges 28 and 30 of the bumper directed toward the vehicle and the channel bottom 26 directed away from the vehicle.

FIGURES 23 to 35 inclusive illustrate another embodiment of this invention which is exemplified, for example in the 1959 Buick rear bumper, modified according to this invention, and which is used to illustrate features of this embodiment.

Figure 32:
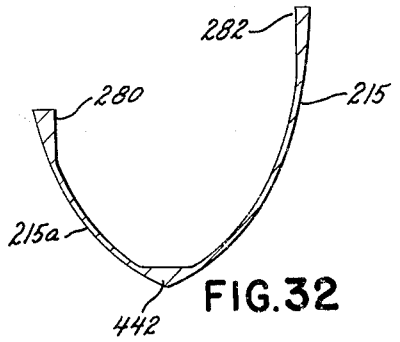
FIGURE 32 is a cross section along the line 32—32 of FIGURE 31.
Figure 33:
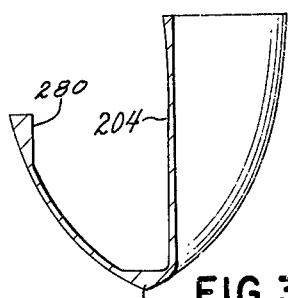
FIGURE 33 is a cross section along the line 33—33 of FIGURE 31.
Figure 31:
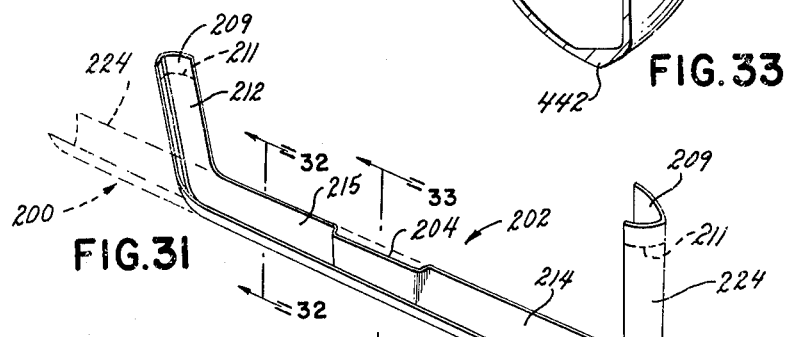
FIGURE 31 is a perspective view which shows the bumper blank in dotted lines before it has been processed in the apparatus shown in FIGURES 23–30 and in full lines after it has been processed by such apparatus.

FIGURES 31–33 show the modified 1959 Buick rear bumper in various stages of production.

FIGURES 23–30, 34 and 35 show an apparatus for practicing a method for bending a straight blank 200, such as shown in dotted lines in FIGURE 31 into the shape shown in full lines at 202 in FIGURE 31.

The straight, dotted line, blank 200 of FIGURE 31 previously has been cast, extruded, cut, heated, and soaked in an atmosphere of air and $NH_4$ or the like, in a manner similar to the steps described in connection with FIGURES 1–21, or according to steps A–L, inclusive of FIGURE 22. The metallic material may be of the character herein elsewhere specified, and for example may be an aluminum alloy of the character known as the 6364 series.

The blank 200 of FIGURE 31 preferably is substantially within a temperature range in the order of form 935–980° F. when it leaves furnace L of FIGURE 22 and is introduced into the apparatus of FIGURES 23–30, 34 and 35. It is formed and bent into the shape shown in full lines 202, FIGURE 31, within about 10 to 45 seconds. The formed or bent blank 202 is then immediately quenched substantially to room temperature in a violently circulating air quench or a water quench, as diagrammatically illustrated at N in FIGURE 22. Thereafter suitable steps are performed on the quenched blank 202, such as indicated at O–S in FIGURE 22 to finish the blank 202 into a substantially completed bumper.

The general cross section of the blank 200 and 202 is substantially as shown in FIGURE 32. The blank may be channel shaped with two longitudinal spaced edges 280 and 282 and a longitudinal channel bottom 442 and with extra thickness in one or more bend resisting zones, such as at the edges 280 and 282 and at the channel bottom 442. The edges 280 and 282 are to be directed toward the vehicle and the bottom 442 is to be directed away from the vehicle when the bumper which is made from the blank is attached to the vehicle. An indented portion 204 of FIGURES 31 and 33 is also formed in the blank 202 while in the apparatus of FIGURES 23–30, 34 and 35. This indented portion 204 is later finished into a tail light window.

The original straight blank 200 and the bent blank 202 of FIGURE 31 has excess material 209 at its ends, which later is removed approximately at 211 during the steps indicated at O–S, FIGURE 22, and the remaining portions 212 of the bent ends, and the central straight portion 214 of the bent blank 202, FIGURE 31, are finished as desired.

Reference now is made to FIGURES 23–30, 34 and 35, which show one embodiment of the apparatus and method for bending the straight blank 200 into the bent blank 202 of FIGURE 31.

Figure 23:
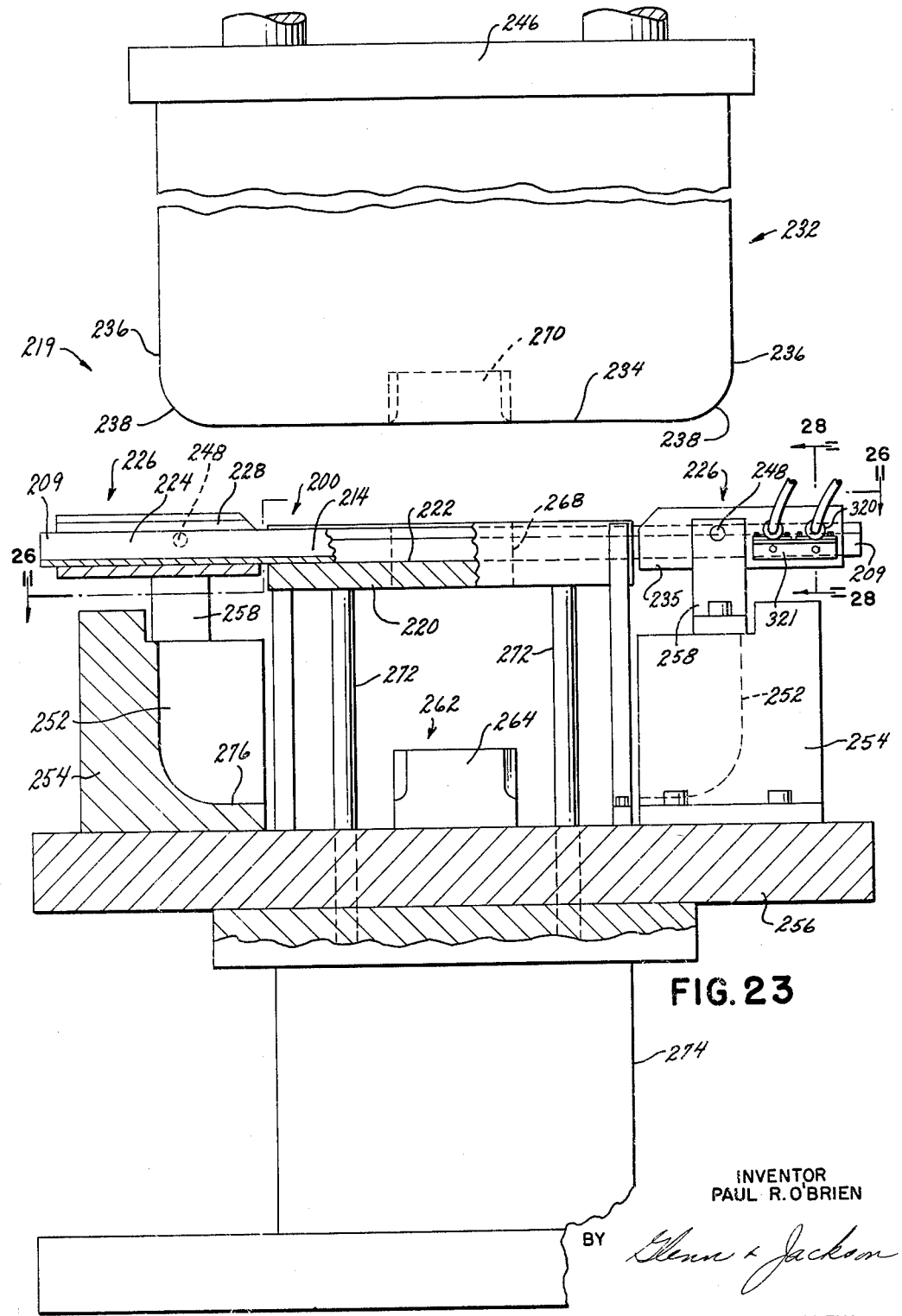
FIGURE 23 is a diagrammatic elevation, partly in cross section, of an apparatus for bending the ends of a bumper formation or blank, which blank is shown in initial position in the apparatus.
Figure 29:
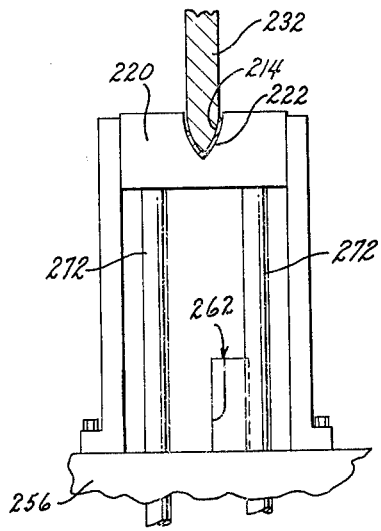
FIGURE 29 is a cross section along the line 29—29 of FIGURE 24.

The apparatus 219, FIGURE 23, for bending the blank 200 of FIGURES 23 and 31 into the bent blank 202 of FIGURES 25 and 31, and for practicing a corresponding method for forming a bumper, may include a center pressing member 220 having a center pressing member groove 222 of FIGURES 23, 26 and 29 to receive, in initial position, the substantially straight, groove shaped, bumper blank 200 of FIGURE 31, and which has the general cross section shown in FIGURE 32. The bumper blank 200 is placed in the groove 222 with its ends 224 extending beyond the pressing member 220. A pair of rocker members 226 are located respectively at each end of the pressing member 220, and have a rocker member groove 228 of FIGURES 23 and 28 which are aligned in initial position, with the pressing member groove 222 to receive the ends 224 of the bumper blank 200.

If desired, the apparatus shown in FIGURE 23 may be one of a pair of substantially identical apparatuses shown in FIGURE 30.

A punch member 232 has a central ridge member 234 relatively movable into the pressing member groove 222 to hold the bumper blank 200 in the pressing member groove 222. The punch member 232 also has a pair of punch side ridge members 236 respectively at each end of the central ridge member 234 and at an angle thereto, such as a right angle, with a curved portion 238 joining the end ridge members 236 to the central ridge member 234.

Means are provided, and are shown in FIGURES 24, 25 and 31, to cause relative movement between the center pressing member 220 and the rocker members 226 to bend the bumper blank ends 224 at an angle to the central portion 214 of the bumper blank, with the ends 224 being joined by a curved portion 240. The punch holder 246 carries the punch 232 and moves it into contact with the center pressing member 220 while the punch end ridge members 236 contact the inside ends 235, FIGURE 23 of the rocker members 226 to cause them to turn about the fulcrums 248 from their initial aligned or level positions, which are shown in FIGURE 23, to a substantially perpendicular position with the ends 224 as shown in FIGURE 25. This bending operation is illustrated also in FIGURE 31, with the straight position in dotted lines and the bent position in full lines.

The pressing operation is such that the punch 232 moves down until the lower, central ridge member 234, FIGURE 29, is snugly within the groove 214 of the bumper blank 200 which, in turn, is within the groove 222 of the center pressure member 220. The curved punch portions 238 at the ends of the central ridge member 234 extend sufficiently far initially to extend into the ends 235 of the rocker members 226 and into contact with the groove 214 of the bumper blank 200. At this time the bumper blank 200 is still in a relatively straight condition. However, with a further downward movement of the punch 232, FIGURE 24, the rocker members 226 start to turn about the fulcrums 248, so that gradually the curved portion 238 and the end ridge member construction 236 finally bring the rocker members 226 into vertical position, FIGURE 25, to bend the straight blank 224 of FIGURE 23 into the bent blank 224 of FIGURE 25, substantially at right angles to the straight central portion 214. The results of this motion is shown in FIGURE 31 in which the dotted line blank straight ends 224 are bent into full line ends 212.

The downward movement of the punch 232, FIGURE 25, continues until the end ridge members 236 enter the re-strike grooves 252 in the re-strike dies 254. The re-strike dies 254 are stationarily held or mounted on the stationary die shoe 256. The re-strike grooves 252 smooth out any corrugations that might be formed at the bends 240, FIGURES 31 and 25.

The fulcrums, or pivot pins 248, may be mounted on pedestals 258, which, in turn, may be mounted on the re-strike die 254 to hold the fulcrums 248 in stationary position.

Means are provided to strike a license plate formation 204, FIGURE 31, in the bumper blank 202. To this end, a stationary license plate die 262 in FIGURES 23–27 is mounted on the die shoe 256. The license plate die 262 has a flat face 264, with a curved upper end 266 in FIGURE 27, to flatten the larger wing 215 in FIGURE 32 of the blank 202 into a license plate receptacle 204, of FIGURE 31. The smaller wing 215a remains substantially unbent. The license plate die 262 is encompassed in the opening 268 of FIGURE 26 in the center pressing member 220 when the member 220 nears its lowest point of travel. The punch 232 has an indentation 270, FIGURES 23 and 27, formed therein to receive the flattened portion 204, FIGURE 33, of the bumper blank 202.

The center pressing member 220 is supported by a plurality of pins 272 which extend down through the die shoe 256, FIGURE 23, and are supported by an air cushion 274 which maintains a yieldable pressure against the downward movement of the punch 232 firmly to hold the bumper blank 202 within the groove 222 of the pressing member 220 as shown in FIGURE 23. The air cushion 274 allows the pressing member 220 to descend to the position shown in FIGURE 25 where the bottom of the groove 222 is substantially aligned with the bottom 276 of the re-strike groove 252 to smooth cut the wrinkles which tend to be formed at 240 between the straight portion 214 and the bent ends 224 of the bumper blank 202 as shown in FIGURES 25 and 31.

It may be desirable at times, due to equipment limitations, to form the ends 212 of the bumper with the rocker members 226 and then to transfer the product immediately to a re-strike die to reform the ends 224 and to form the license plate area 204 of FIGURE 31.

Figures 34, 35:
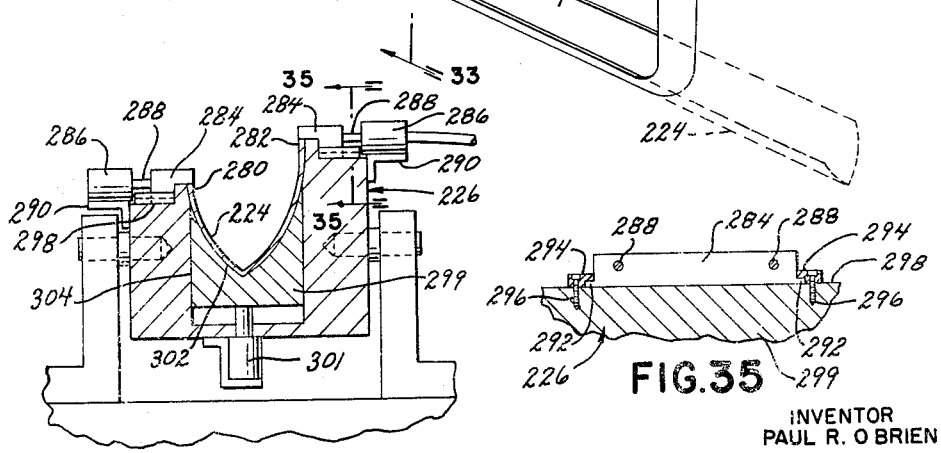
FIGURE 34 is a cross section similar to FIGURE 28 showing another embodiment of the gripping means for the end of the bumper blank in the rocker member.
FIGURE 35 is a cross section along line 35—35 of FIGURE 34.

Means are provided in the rocker member 226, FIGURES 34 and 35, to hold and grip the edges 280 and 282 of the bumper blank 202 from turning during the bending operation, and to exert a pulling action on the ends of the bumper blank. Such means may take the form of flanges 284 which may be moved to the position shown in FIGURE 34 from a retracted position by means of the cylinders 286 which have connecting rods 288 attached to the flanges 284. The air cylinders 286 are mounted on platforms 290 which are secured to the sides of the rocker members 226 by bolts or welds, not shown. The flanges 284, in turn, have side flanges 292 which slide under the angle members 294 which are bolted at 296 to a top portion 298 of the rocker members 226.

Similar flanges 284, cylinders 286, connecting rods 288, etc., are provided for both edges 280 and 282 on both sides 215 and 215a of rocker members 226 as shown in FIGURES 32 and 34.

A movable plunger 299 may be moved upwardly by the plunger and cylinder formation 301, FIGURE 34, to push the edges 280 and 282 of the ends 224 up against the flanges 284 to secure and hold the bumper ends 224 tightly. This prevents turning of the blank and produces a pull on the ends of the blank.

The unbent ends 224, FIGURES 23 and 31 of the bumper blank 200 and the bent ends 212, are held within the groove 302, which is formed in the member 299 and which is slidably in the generally rectangular channel 302 in the rocker members 226. The slidable member 299 is pushed upward by the air cylinder construction 301 after the flanges 284 have been moved over the edges 280 and 282 of the bumper blank.

If desired, the lower edges of the flanges 284 may be serrated (not shown) to produce a firm gripping action on the edges 280 and 282 of the bumper blank, to exert the desired tension on the ends 224 as they are being bent. This reduces or inhibits any corrugation formation at the bend 240 during the bending operation.

One form of means for gripping the ends 224 of the bumper blank 200 may be provided, as shown in FIGURES 23 to 30. Plunger and cylinder constructions 320 supported on rocker members 226 by brackets 321 move pins 322 into the bumper receiving grooves 303 (FIGURE 30) of the rocker members 226. Stationary bars 324 are provided on the sides of the grooves 303 which are opposite to the plungers 322 and which bars 324 are secured to the walls of members 226. The bumper blank 224 is placed in the grooves 303, first with the long edges 282 under the bar 324. Then the edge 280 is twisted down by the operators standing at each end of the bumper blank 224. Thereafter the plunger pins 322 are pushed in by the plunger or cylinder constructions 320. The surface of the groove 303 may be serrated to produce a gripping action. Likewise, the surfaces of the grooves 302 of FIGURE 34 may be serrated to produce a gripping action.

Movable plunger 299 of FIGURES 34 and 35 with its operating parts may be substituted in the construction shown in FIGURES 28 and 30, if desired.

Heating means may be provided for any of the members of the bending apparatus, such as the punch 232. Such heating means may take the form of electrical resistance heaters which may be of the metallic sheath type in which helical resistance heaters are embedded in insulating powder such as $M_2O$, and which heaters are well known construction.

After the blank 202 has been bent and formed as indicated in full lines in FIGURE 31, the blank is quenched in violent air circulation or in a water quench as diagrammatically indicated at N in FIGURE 22. Thereafter the steps diagrammatically indicated at O, P, Q, R and S in FIGURE 22 may be applied to the blank 202 of FIGURE 31 to produce the bumper.

Sequential controls, manual or automatic, may be provided for all embodiments. If automatic, a program control may be provided which automatically actuates the desired number of parts in sequential manner after having been started by a starting push-button or the like.

Figure 36:
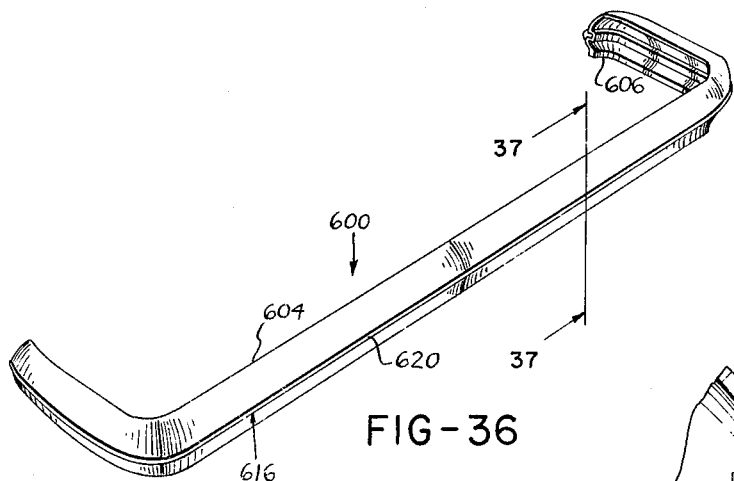
FIGURE 36 is a view in perspective of another embodiment of a bumper according to this invention.

FIGURES 36 et seq. show other embodiments of a bumper made according to the objects of this invention.

The bumper 600 may be a metallic automotive bumper and include an extrusion 602 of an aluminum containing metallic material such as an aluminum alloy as herein set forth. The material may be prepared and extruded as herein disclosed, and the extrusion may be formed into a bumper of any shape by any of the steps, apparatus and methods herein disclosed, with appropriate modifications to produce the embodiments of FIGURES 36 et seq., now readily apparent to those skilled in the art, in view of the disclosure herein.

FIGURE 36 shows a bumper in perspective with bent ends somewhat similar to those in the embodiment shown in FIGURES 31–35. However, the principles of the invention disclosed in connection with FIGURES 36 et seq., may also be applied to the bumpers of the other embodiments herein previously disclosed.

Figure 37:
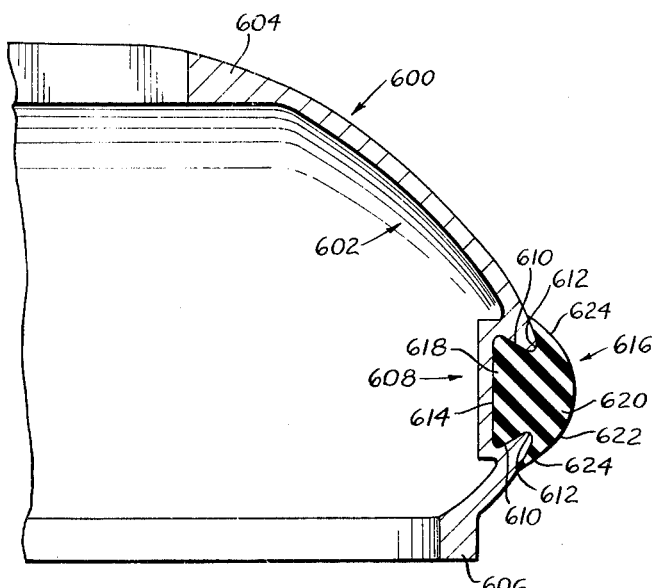
FIGURE 37 is an enlarged cross-section taken along the line 37—37 of FIGURE 36.

The extrusion 602 of FIGURE 37 may include enlarged edges 604 and 606 and an impact insert receiving groove or indentation 608 which has tapered or gripping edges 610 which are tapered outwardly behind the opening lips 612 toward the groove bottom floor 614 in a manner to hold the impact insert member 616 in a firm and secure manner.

The impact insert member 616 may be an impact receiving band or longitudinal insert which extends along a part or along the entire length of the bumper. It may be made of any material suitable effectively to receive and absorb the usual impact which a bumper is intended to absorb. The material also may be of any type which may be inserted in a groove of the character shown in FIGURES 36 et seq., in any suitable manner, for example, as by forcibly inserting the outwardly flared attaching flange 618 in the groove 608 by the action of a suitable plunger, hammer or mallet, or the like. For example, such materail may be a material which has the characteristics of hard rubber or rubber-like material, either of natural or synthetic nature. Hard black rubber may be used if desired.

When desired, the exposed impact body 620 may have a rounded impact surface 622 and may have flanges 624 which are biased during construction so such flanges press firmly and tightly against the outer metallic surface of the bumper.

For example, the extrusion 602 may be treated and formed by the apparatus and methods disclosed in connection with FIGURES 1–35 inclusive and 25A, and, for example, in connection with FIGURES 23–35 and 25A, with modifications made obvious by this disclosure. The extrusion may be completed into a form such as shown in FIGURE 36, or into any of the forms shown in FIGURES 1 to 35 inclusive and 25A, with an inward groove added of the form shown in FIGURES 36 et seq. Thereafter, the impact insert shown in these FIGURES 36 et seq. may be inserted in such inward groove.

Figure 39:
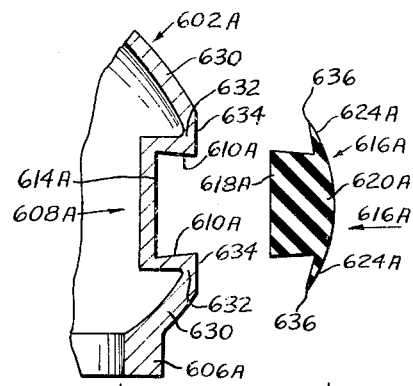
FIGURE 39 is a cross-section of the parts of FIGURE 38 before assembly.
Figure 38:
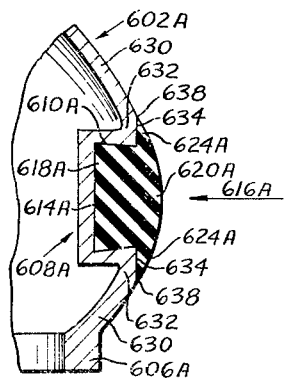
FIGURE 38 is a cross-section of a portion of a bumper somewhat similar to the bumper of FIGURES 36 and 38 but showing another embodiment of the insert.

In the embodiment of FIGURES 38 and 39 the parts which are similar to certain parts of FIGURES 36 and 37 are numbered with similar reference numerals to which the suffix "A" has been added. The description of such similar parts is not repeated where the description of the corresponding parts in FIGURES 36 and 37 are substantially equally applicable.

In FIGURES 38 and 39, the curved portions 630 of the extrusion merge with the substantially straight portions 632 which form substantially flat aligned outer surfaces 634 which receive the slightly biased flanges 624A of the insert 616A with a tight contact between the edges 636 of the insert and the outer surface of the metallic bumper substantially at the merging point 638 of the curved portions 630 with the flat surfaces 634.

With the construction disclosed in connection with FIGURES 36 et seq., an attractive bumper is produced and an efficient method of manufacturing the same is provided in which the normal substantially harmless impacts, such as during parking, etc., are readily absorbed without damage either to the bumper of FIGURES 36 et seq., or to the adjacent car which may be impacted during the parking operation of either car.

In all of the forming steps herein described, the desired heat of the blank may be a residual heat from a previous operation, or the heat may be heat (additional or original) introduced for a particular forming step.

The punch members and die members of all of the embodiments herein disclosed may be heated by electric heaters or the like to temperatures on the order of 350°–400° F. or other desired temperature. The bumper blanks or other articles produced and treated in connection with all of the embodiments herein disclosed may be treated according to any or all of the steps diagrammatically shown in FIGURE 22 and described in connection therewith in the specification. The aluminum containing metallic material in all of the bumpers herein described may be aluminum alloy material of the character herein specified.

Improved articles such as the aluminum alloy bumpers herein disclosed and the like, are thus provided. These articles are made by the improved apparatus and the improved methods herein disclosed.

While the form of the invention now preferred has been disclosed as required by the statutes, other forms may be provided, all coming within the scope of the claims which follow.

What is claimed is:

1. A method of constructing an automotive vehicle bumper of the type which is subjected to severe impacts in an outermost impact zone, which method comprises: producing an open channel shaped extruded blank of cross sectional irregular thickness and longitudinal uniformity and with a longitudinally uniform impact zone of extra cross sectional thickness and made of a heat treatable aluminum age hardenable alloy and of a length suitable to form an automotive vehicle bumper; heating said blank to a drawing and heat treating temperature; drawing said blank while in heated condition into a bumper form suitable for use as an automotive vehicle bumper with the open portion of said open channel directed toward said vehicle; and quenching and aging said bumper.

2. A method of constructing an automotive vehicle bumper of the type which is subjected to extra bending strain in a longitudinally uniform bend resisting zone, which method comprises: producing a heat treatable, aluminum age hardenable alloy, extruded blank with two longitudinal spaced edges, and a longitudinal channel bottom and with cross sectional, extra thickness in a longitudinally uniform bend resisting zone; heating said blank to a hot drawing and heat treating temperature; drawing said heated blank to bend the ends of said blank in the direction of said spaced edges to shape said blank into bumper form for attachment to an automotive vehicle with said spaced edges directed toward said vehicle and with said channel bottom directed away from said vehicle; and quenching and aging said bumper.

3. A method according to claim 2 in which said bumper is of the type which is subjected to extra bending strain along a longitudinally uniform bend resisting zone extending along said channel bottom, and in which extra thickness is provided in said channel bottom.

4. A method according to claim 2 in which said bumper is of the type which is subjected to extra bending strain along the longitudinally uniform bend resisting zones extending along said spaced edges, and in which extra thickness is provided at said edges.

5. A method according to claim 2 in which said bumper is of the type which is subjected to extra bending strains along a longitudinally uniform bend resisting zone along said channel bottom and along the longitudinally uniform bend resisting zones extending along said spaced edges, and in which extra thickness is provided in said channel bottom and in said edges.

6. A method according to claim 2 in which said alloy is treatable with ammonium fluoborate, is chemically brightenable, and in which said blank is heated to a temperature from about 935° F. to 980° F., is treated in an atmosphere of air and ammonium fluoborate, is drawn while it retains a substantial part of its original heat at temperatures within from about 800° F. to 950° F., quenched, as soon as possible after it is drawn, and is then artificially aged, chemically brightened and anodized.

7. A method according to claim 2 in which said blank ends are bent by holding said blank between a center pressing member groove, a pair of rocker member grooves, a central ridge member, a pair of end ridge members respectively at each end of said central ridge member and at an angle to said central ridge member.

8. A method according to claim 7 in which the edges of said blank are held at the ends against rotational displacement while bending said blank ends.

9. A method according to claim 7 in which said blank ends are subjected to tension while bending said blank ends.

10. A method according to claim 7 in which a license plate blank is struck substantially while bending said blank ends.

11. A method according to claim 2 in which said drawing procedure includes drawing the ends of the blank to form end flanges each with a substantially 90° bend at one of its surfaces to form an end flange with substantially straight sides.

12. A method according to claim 2 in which a longitudinal impact member receiving groove is extruded in said channel bottom, and a resilient impact member is inserted in said groove.

References Cited by the Examiner

UNITED STATES PATENTS

| | | | |
|---|---|---|---|
| Re. 7,156 | 6/76 | Lewis et al. | 29—190 |
| 49,257 | 8/65 | Gleason | 29—190 |
| 92,349 | 7/69 | Parlin | 29—190 |
| 1,612,948 | 1/27 | Shaw | 293—98 |
| 1,614,087 | 1/27 | Shaw | 293—98 |
| 1,625,502 | 4/27 | Roepke | 153—17 |
| 1,631,386 | 6/27 | Seymour et al. | 153—17 |
| 1,631,930 | 6/27 | Fuss | 148—12.7 |
| 1,675,644 | 7/28 | Dean | 148—12.7 |
| 1,704,253 | 3/29 | Hybinette | 148—12.7 |
| 1,898,229 | 2/33 | Veale | 293—98 |
| 2,162,855 | 6/39 | Nelson | 153—17 |
| 2,249,349 | 7/41 | Deutsch | 148—159 |
| 2,262,696 | 11/41 | Nock et al. | 148—11.5 |
| 2,401,542 | 6/46 | Booth | 29—156 |
| 2,726,973 | 12/55 | Corral | 148—11.5 |
| 2,998,358 | 8/61 | Nakayama | 148—11.5 |

OTHER REFERENCES

Physical Metallurgy of Aluminum Alloys by A.S.M. 1958 (pg. 237 relied on).

Wernick S. et al.: "Finishing of Aluminum," pp. 120–123. 1959.

DAVID L. RECK, *Primary Examiner.*

LEO QUACKENBUSH, RAY K. WINDHAM, WINSTON A. DOUGLAS, *Examiners.*